Nov. 26, 1946.   E. MINKLER ET AL   2,411,585
APPARATUS FOR SAWING STONE
Filed April 10, 1944
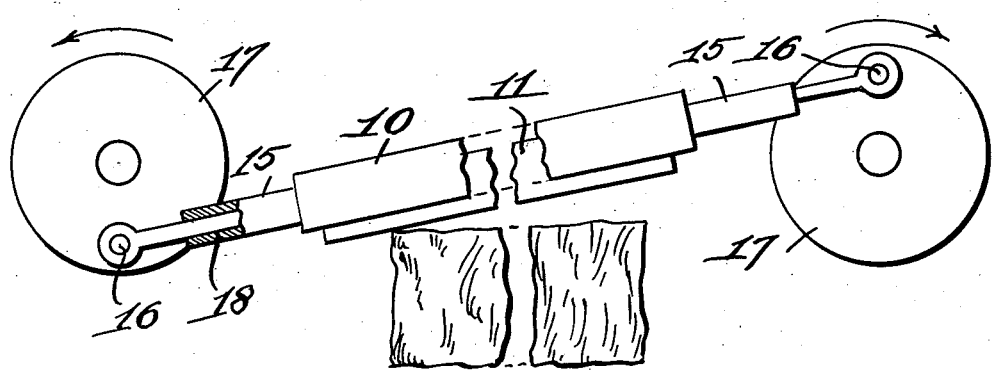
INVENTOR.
EVERETT MINKLER AND
FLOYD E. MINKLER.
By Martin P. Smith
THEIR ATTY.

UNITED STATES PATENT OFFICE 2,411,585

APPARATUS FOR SAWING STONE

Everett Minkler and Floyd E. Minkler,
Los Angeles, Calif.

Application April 10, 1944, Serial No. 530,239

2 Claims. (Cl. 125—16)

Our invention relates to an apparatus for sawing stone and has for its principal objects, to generally improve upon and simplify the existing forms of apparatus for sawing stone, particularly where a gang of saws are utilized for converting the block of stone into a plurality of slabs, and to provide simple, practical and highly efficient means for suspending and actuating the saw carrying sash or frame, so that the cutting edges of the saw will, at all times during their reciprocatory movement, be in direct cutting engagement with the stone, thus materially speeding up the sawing functions and corresponding decreasing the costs of production of the sawed slabs.

With the foregoing and other objects in view our invention consists in certain novel features of construction and arrangement of parts which will be hereinafter more fully described and claimed and illustrated in the accompanying drawing in which the figure is a side elevational view partly in section of our improved stone sawing machine.

Referring by numerals to the accompanying drawing, the ends of a conventional stone saw frame or sash 10, carrying saws 11, are connected by pitmans 15, one or both of which may be provided with a slip or expansion joint such as 18 to wrist pins 16, eccentrically arranged at diametrically opposite points on discs 17 driven at the same speed in opposite directions.

Thus, as the shafts carrying the discs 17 are simultaneously rotated in opposite directions, the saw carrying frame will be oscillated vertically as it reciprocates and during such operation, the slip joint or joints 18 permit changes of the angular positions of the saw frame and its connections to wrist pins 16. Thus as the sash is operated, some portions of the lower edges of the saws 11 will be in cutting engagement with the stone and the points of cutting contact, move first in one direction and then in the other, the full length of the stone.

Repeated tests have demonstrated, that our improved stone sawing apparatus will perform a given amount of work, in much less time than by conventional stone saws where the sash and saws travel in a straight plane.

While we have shown and described an apparatus especially designed for the sawing stone it will be understood that said apparatus may be advantageously employed for sawing various materials, for instance, artificial stone, plastics, relatively soft metals, hard woods and the like.

Thus, it will be seen that we have provided a stone sawing apparatus that is simple in structure, inexpensive of manufacture and very effective in performing the functions for which it is intended.

It will be understood that minor changes in the size, form and construction of the various parts of our improved stone sawing apparatus may be made and substituted for those herein shown and described without departing from the spirit of our invention the scope of which is set forth in the appended claims.

We claim as our invention:

1. In a stone saw, a pair of cranks arranged for rotation so that when one crank is at high center and the other crank at low center, said cranks are disposed 180° apart circumferentially, a saw blade carrying sash positioned between said cranks and telescope connections between said sash and cranks.

2. In a stone saw, a pair of rotating discs, wrist pins carried by said discs and arranged so that when one wrist pin is at high center, and the other wrist pin is at low center, said wrist pins are disposed 180° apart circumferentially, a saw blade carrying sash positioned between said discs and connections between said sash and wrist pins, portions of which connections are telescopic.

EVERETT MINKLER.
FLOYD E. MINKLER.